UNITED STATES PATENT OFFICE.

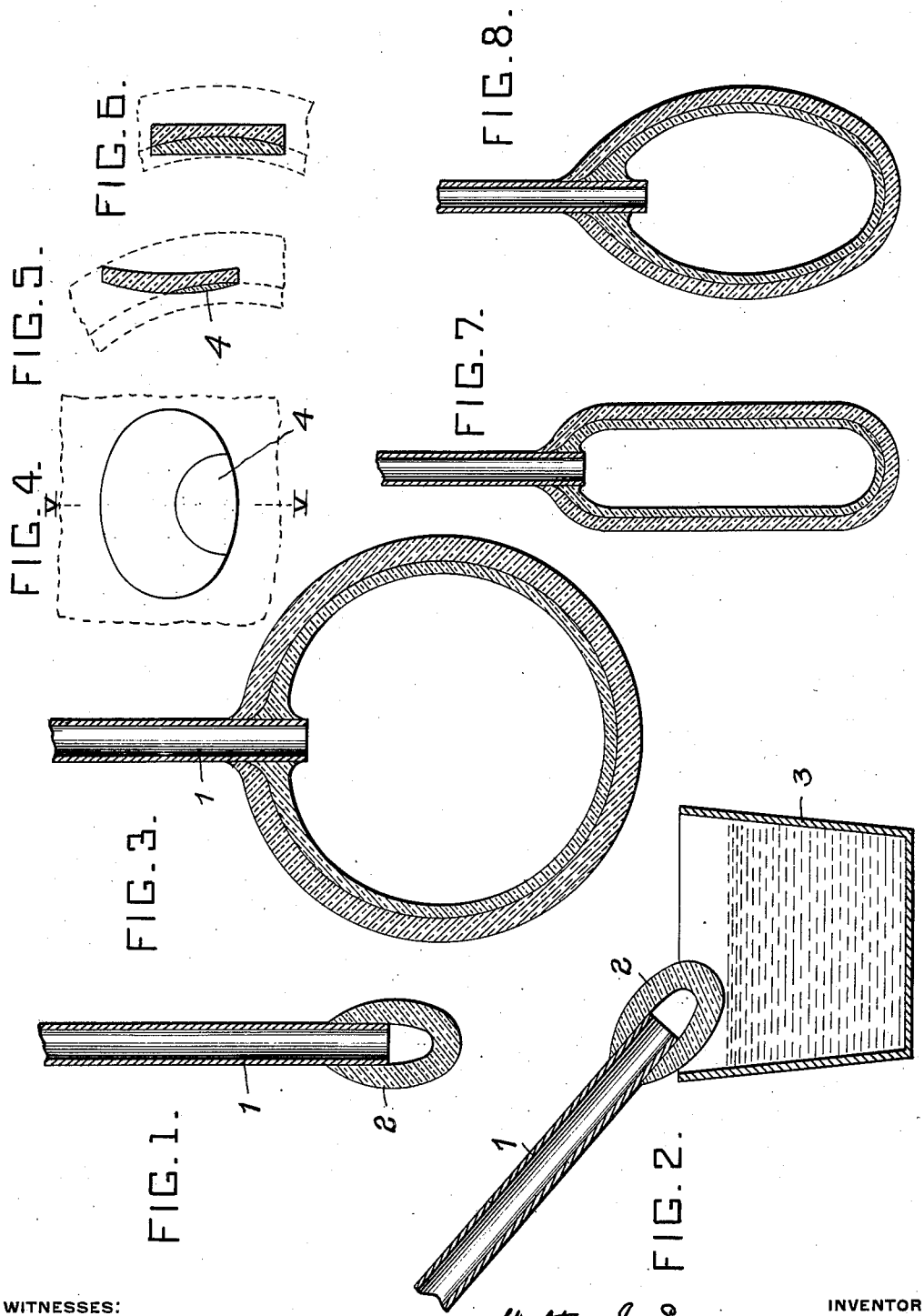

WALTER I. SEYMOUR, OF DENVER, COLORADO.

PROCESS OF FORMING LENSES.

No. 861,055.　　Specification of Letters Patent.　　Patented July 23, 1907.

Application filed May 6, 1907. Serial No. 372,270.

*To all whom it may concern:*

Be it known that I, WALTER I. SEYMOUR, residing at Denver, in the county of Denver and State of Colorado, a citizen of the United States, have invented or discovered certain new and useful Improvements in Processes of Forming Lenses, of which improvement the following is a specification.

My invention relates to a method of forming lenses, and more particularly to a method of forming a lens of separate layers or parts of glass of different kind, index or color, and in shaping such layers while in molten state to give to their united surfaces plane, spherical, or cylindrical curves, as may be necessary or desirable in order to produce a desired focus or foci in the finished lens.

Lenses of the character which I desire to produce by my improved method, have heretofore been produced by fitting lenses of different focus or color, edge to edge, or in cementing a lens of a certain focus on the face of a lens of a different focus, neither of which methods has proven satisfactory for the reason that, in the first vision is broken by the joining line, and in the second an imperfect attachment will cause a blur through the parts.

In the accompanying drawings, forming a part of this specification, Figures 1 and 2 are views illustrating steps in my improved method; Fig. 3 illustrates a spherical shape from which blanks for bifocal and achromatic lenses may be cut; Fig. 4 is a plan of a bifocal lens formed from a blank (shown in dotted lines) cut from the shape shown in Fig. 3; Fig. 5 is a section on a plane indicated by the line V—V Fig. 4; Fig. 6 is a section of an achromatic lens formed from a blank (shown in dotted lines) cut from the shape shown in Fig. 3; Figs. 7 and 8 show shapes from which blanks for compound or toric lenses may be cut.

My improved method consists in so uniting two or more bodies of glass differing in index or kind, while both bodies are in a molten state, and so shaping the united bodies while molten or plastic, that bifocal, achromatic and compound or toric lenses can be produced by simple grinding. By uniting white and colored glasses of the same or different indices, a lens may be produced having a colored and a clear portion.

By joining the different kinds of glass in such manner while both are in molten state, the blank from which the finished lens will be subsequently formed, may be blown, pressed, rolled or otherwise shaped into spherical, cylindrical or other curved shape, as may be desired, for securing curves of the degree necessary for forming lenses of single or compound refractive powers, or if desired the blank may be made with flat, plane sides.

While the blank may be formed by rolling or pressing, I prefer to form the blank by blowing the united bodies, this being accomplished by gathering on the end of a blow-pipe 1, a body 2 of glass of a certain kind or index or color, and then either with or without shaping the initial body 2, dipping it into a pot 3 of molten glass of different kind, index or color. In dipping the body 2 into the molten glass care should be taken that the molten glass will move progressively along the body 2 and thereby wash away any air bubbles or foreign matter or imperfections on the surface of such body, thereby insuring a perfect union between the two layers. As the glass for the second layer is in a molten condition, it will act to restore any heat lost by the body 2 when the latter is immersed and any lines or any defects which may have formed on the surface of the body 2 will be removed as the latter will be raised, at least as regards the outer portions thereof, to the temperature of the molten glass.

The body of glass consisting of the two united layers may be shaped by blowing alone, but preferably by blowing in a suitable mold, in the manner well known in the art of blowing, so as to insure regularity and uniformity of contour.

After the shell 2 consisting of two or more layers has been produced, a section or blank (shown in dotted lines in Figs. 4, 5 and 6) is cut from the body of this shell and this section ground so as to form a lens, shown in full lines in Figs. 4, 5 and 6, which is made up or composed of a plurality of kinds or colors of glass. In making bifocal lenses the blank is ground to shape shown in full lines, so that the different focal centers are placed in the desired parts of the finished lens, in this way securing a lens of as many focal powers as desired, the number being dependent upon the number of glass layers of different kinds, index or color which have been formed into one integral body, and the arrangement of the focal centers being adjusted by the grinding process.

It will be understood that in grinding a bifocal lens from a blank which has been formed in accordance with my improved process, one or more of the layers of which the blank is composed as hereinbefore described, may be cut entirely away except for a portion 4 of the surface of the lens, and in this manner a lens will be produced having a plurality of foci, and thus when used for spectacle lenses for example, the wearer may get a certain visual effect through one portion of the lens and another desired visual effect through another portion of the lens.

In Fig. 6 is shown an achromatic lens formed by grinding the outer surfaces of the blank, the uniting surfaces between the two layers being properly curved in forming the shell 3.

In forming lenses by the method or process which is described herein, it will be understood that the uniting surfaces of the component layers or the lens-blank may be plane, spherical, cylindrical or sphero-cylindrical—that is, a surface of compound curvature showing profiles when cut on different lines, of different curvature.

The mass of united glasses may be given a cylindrical or sphero-cylindrical shape, as shown in Figs. 7 and 8, so that pieces cut from any portion thereof will form a blank from which a lens having a compound or toric effect may be produced by grinding the surfaces to flat or spherical curves.

Since my process involves the use of a plurality of bodies of glass, it will be understood that achromatic lenses will be produced by the proper selection of material.

Other advantages of my invention will readily appear to those skilled in the art.

Having thus described my invention, what I claim as new therein and desire to secure by Letters Patent, is,—

1. The method of forming lenses which consists in bringing together and uniting two or more bodies of different kinds of glass when in a molten state, shaping the united bodies while in a molten state, and in grinding the blank thus produced to form a lens.

2. The method of forming lenses which consists in uniting two or more bodies of different kinds of glass when in a molten condition, shaping the surfaces of union of such bodies to the desired curvature by pressure applied to the surfaces of the united bodies while in a molten condition and grinding the blank so formed to produce a lens.

3. The method of forming lenses herein described which consists in uniting two or more bodies of different kinds of glass while in a molten condition, shaping the surfaces of union of such bodies to the desired curvature, severing a blank from the body thus formed and shaped, and grinding the severed blank to produce a lens.

4. The method of forming lenses consisting in shaping two or more bodies of different kinds of glass while in a molten state, shaping the united bodies to form a blank and grinding the blank so formed to produce a lens of multiple focus.

5. The herein described method of forming lenses which consists in bringing together two or more bodies of molten glass, forming from the united bodies while still in a molten condition a compound blank having curved uniting surfaces, and in grinding the outer surfaces of the blank to form a lens.

6. The herein described method of forming lenses which consists in bringing together two or more bodies of molten glass, forming from the united bodies while still molten a blank having the uniting surfaces so shaped as to give a compound or a toric effect in the finished lens, and in imparting to the outer surfaces of said blank a flat or spherical contour by grinding.

In testimony whereof I affix my signature in presence of two witnesses.

WALTER I. SEYMOUR.

Witnesses:
BAYARD H. CHRISTY,
ALICE A. TRILL.